United States Patent [19]

Mita et al.

[11] Patent Number: 4,653,111
[45] Date of Patent: Mar. 24, 1987

[54] IMAGE DATA MONITOR APPARATUS

[75] Inventors: Yoshinobu Mita, Kawasaki; Yoshinori Ikeda, Tokyo, both of Japan

[73] Assignee: Canon Kabushiki Kaisha, Tokyo, Japan

[21] Appl. No.: 639,387

[22] Filed: Aug. 10, 1984

[30] Foreign Application Priority Data

| Aug. 17, 1983 | [JP] | Japan | 58-150015 |
| Aug. 17, 1983 | [JP] | Japan | 58-150016 |
| Aug. 17, 1983 | [JP] | Japan | 58-150017 |
| Aug. 17, 1983 | [JP] | Japan | 58-150018 |
| Aug. 17, 1983 | [JP] | Japan | 58-150019 |

[51] Int. Cl.⁴ .............................................. G06K 9/36
[52] U.S. Cl. ......................................................... 382/69
[58] Field of Search ................................ 382/54, 41, 69

[56] References Cited

U.S. PATENT DOCUMENTS

| 4,498,104 | 2/1985 | Schulz | 382/54 |
| 4,520,505 | 5/1985 | Yamamoto et al. | 382/54 |
| 4,541,116 | 9/1985 | Lougheed | 382/54 |

Primary Examiner—Stephen A. Kreitman
Attorney, Agent, or Firm—Fitzpatrick, Cella, Harper & Scinto

[57] ABSTRACT

An image data monitor apparatus has a CCD for reading image data of a document, an input buffer for receiving the pixel data from the CCD, an image processor for processing the data received from the CCD for printing out an image or the like, a circuit including a counter for extracting the designated pixel data, a keyboard for setting a desired mode, LEDs for displaying the extracted pixel data and other data, and a CPU for controlling the operation of the overall system. Various data such as maximum and minimum values of, an average value of or a maximum difference between the pixel data can be monitored at high speed upon selecting a corresponding mode. Desired data processing can be performed based on the monitored data.

39 Claims, 19 Drawing Figures

FIG. 8

IMAGE DATA MONITOR APPARATUS

BACKGROUND OF THE INVENTION

1. Field of the Invention

The present invention relates to a monitor apparatus for monitoring image data produced from an image reader or the like.

2. Description of the Prior Art

In order to obtain a good quality image signal from an image reader for reading an image by photoelectric conversion by means of a solid image sensor such as a CCD, each light-receiving element of the solid image sensor must be able to operate well and there must not be output variations between individual elements. It is therefore preferable to separately recognize image signals from respective light-receiving elements of the solid image sensor.

In order to examine desired pixel data from the solid image sensor, a monitor apparatus such as an oscilloscope or logic analyzer is conventionally used.

However, if changes in the pixel data are quick, the human eye cannot follow such changes and so reading precision is poor.

When the changes in the pixel data are slow, even if such changes can be read, correspondence between the pixel data and pixel positions corresponding thereto is hard to establish.

SUMMARY OF THE INVENTION

The present invention has been made in consideration of this and has as its object to provide a monitor apparatus of image data which is novel and which is easy to use.

It is another object of the present invention to provide a monitor apparatus which allows easy recognition of desired image data.

It is still another object of the present invention to provide a monitor apparatus which allows discrimination of reading characteristics in image reading.

It is still another object of the present invention to monitor image data with good precision.

It is still another object of the present invention to provide a monitor apparatus which is a general purpose apparatus.

The above and other objects, features and effects of the present invention will become apparent from the following description taken in conjunction with the accompanying drawings.

DETAILED DESCRIPTION OF THE PREFERRED EMBODIMENT

The preferred embodiment of the present invention will be described with reference to the accompanying drawings.

Figure 1:
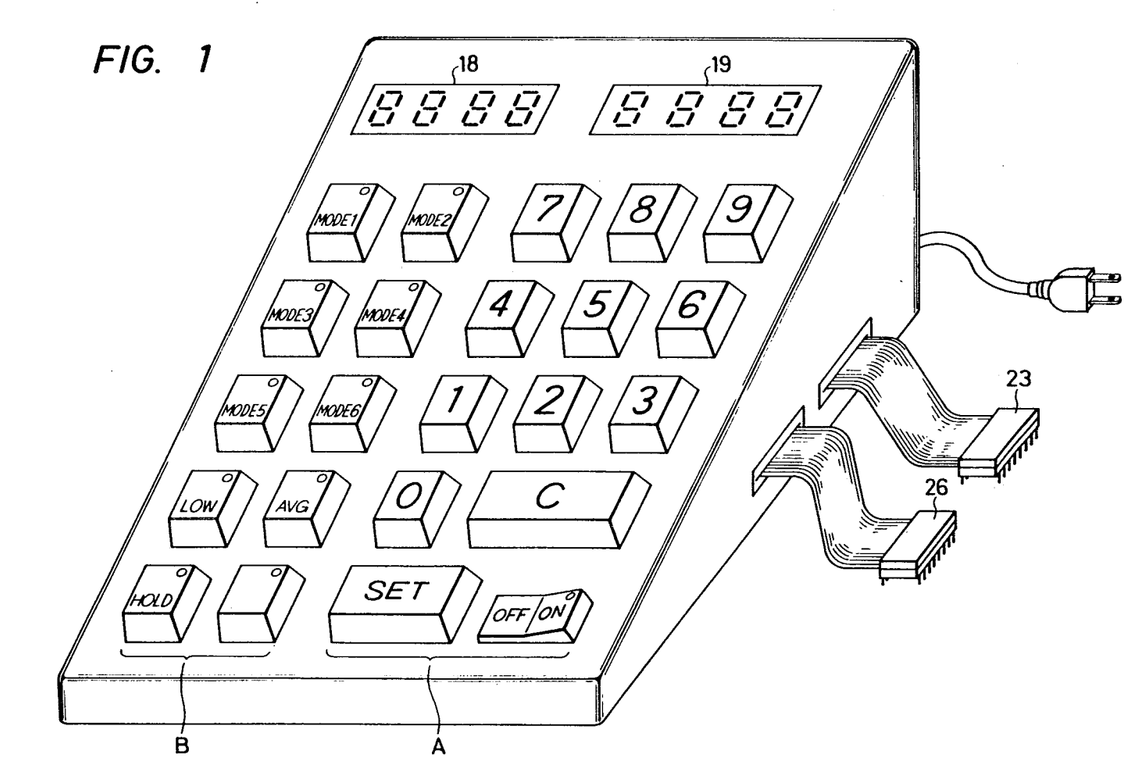
FIG. 1 is a view showing the outer appearance of a monitor apparatus according to an embodiment of the present invention.

FIG. 1 is a view showing the outer appearance of a video monitor apparatus according to the embodiment of the present invention.

The video monitor apparatus of this embodiment is connected to an image information reader and an image information processor through connectors 23 and 26, respectively. Portion A has a power source switch and a ten key switch portion, and portion B is a mode selection key switch portion. Each mode selection key is an LED-type key switch: an LED is arranged at the upper right portion of the key top. When a mode is selected, the LED of the corresponding key mode selection key is turned on so that the operator can confirm the selected mode.

A display 18 at the upper portion comprises a 7-segment LED for displaying the address of pixel data from a solid image sensor (to be referred to as a CCD hereinafter) of an image information reader. Another display 19 comprising a 7-segment LED displays the pixel data.

Figure 2:
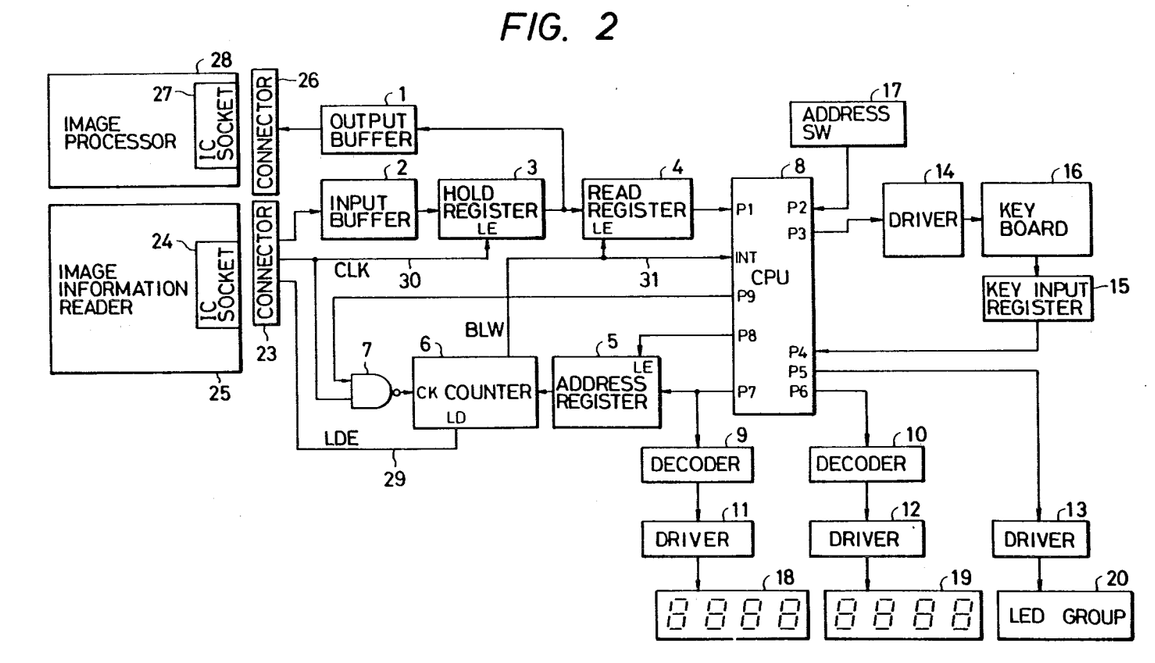
FIG. 2 is a block diagram of the apparatus shown in FIG. 1.

FIG. 2 shows a block diagram of the video monitor apparatus shown in FIG. 1.

Referring to FIG. 2, an input buffer 2 receives, through the connector 23, pixel data or digital signals from an image information reader 25. An output buffer 1 supplies the pixel data from the CCD to an image processor 28 so that the image processor can perform spontaneous image processing. A hold register 3 comprises a soft register which temporarily holds the pixel data from the input buffer 2. A read register 4 reads the pixel data from the hold register 3. A microcomputer 8 (to be referred to as a CPU hereinafter) controls the overall operation of the system including display processing of the pixel data from the CCD. An address register 5 holds a read address for reading out the pixel data from the CCD, the read address being supplied from the CPU 8. A decimal down counter 6 counts a 4-bit pixel data reading address. A NAND gate 7 is connected to the counter 6. Decoders 9 and 10 are connected to the CPU 8 and supply outputs to drivers 11 and 12, respectively, which drive the displays 18 and 19 comprising 7-segment LEDs, shown in FIG. 1. A mode selection key illuminating LED group 20 is driven by a driver 13 similarly connected to the CPU 8. A driver 14 transmits an output from the CPU 8 to a keyboard 16. A key input register 15 transmits the key input state of the keyboard 16 to the CPU 8. An address switch 17 supplies to the CPU 8 a total number (i e., maximum address) of pixel data of one main scanning line of the image information reader 25 connected to the connector 23. The image information reader 25 reads the pixel data from the CCD and converts the obtained analog signals into digital signals. The connector 23 of the apparatus is inserted into or connected to a pixel data hold IC or an IC socket 24 of the reader 25 to obtain the pixel data, a clock signal CLK 30 and a data load timing signal LDE 29. The image processor 28 receives the pixel data as described above and processes it and comprises, for example, a printer. Pixel data is supplied from the monitor apparatus to an IC socket 27 for the input buffer IC of the image processor 28.

In this embodiment, the image information reader and the image processor are separated from each other. However, if the reader and processor are formed into a single unit, reading of the pixel data into the monitor apparatus can be performed by connecting the pixel data read by a CCD and A/D converted by an A/D converter to a buffer IC through an IC clip or the like and obtaining various signals from the integral unit. Then, the pixel data can be monitored without requiring any change in the image information reader or image processor.

Figure 7:
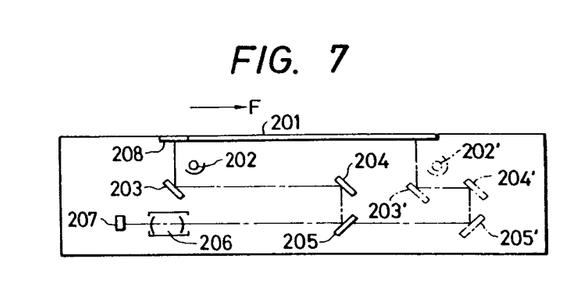
FIG. 7 is a sectional view showing the construction of an information image reader to which the present invention is applied.

FIG. 7 shows an example of the construction of the image information reader 25.

Referring to FIG. 7, the reader 25 has an original glass table 201, a rod-shaped light source 202 such as a halogen lamp or a fluorescent lamp, a first mirror 203, a second mirror 204, a third mirror 205, a lens 206, a one-dimensional solid image sensor 207 such as a CCD, and a white reference board 208.

The operation of the image information reader 25 will be described below. An original placed on the original glass table 201 is illuminated with light from the rod-shaped light source 202 and subscanned with the first mirror 202, the second mirror 204, the third mirror 205 and the lens 206 to form an image on the CCD 207. The main scanning direction of the CCD 207 is a direction perpendicular to the sheet of drawing. The rod-shaped light source 202 and the first mirror 203 are supported integrally with a support (not shown), and move in a direction indicated by arrow F on guide rails (not shown) so as to scan the original surface (subscanning). The second mirror 204 and the third mirror 205 are supported integrally with another support (not shown), and move on guide rails (not shown) in the same direction as the first mirror 203 at a speed half that thereof. The rod-shaped light source 202, the first mirror 203, the second mirror 204, and the third mirror 205 move from read start positions indicated by solid lines to read end positions (202', 203', 204', and 205') indicated by dotted lines. During such movement, the optical path length from the original table 201 to the lens 206 through the mirrors 203, 204 and 205 is kept constant.

The reader 25 subscans an A4 size original along its widthwise direction and has a line density of 16 line/mm. The reader 25 has a resolution of 16 pel/mm along the main scanning direction. Therefore, the number of output bits of one main scanning line is 3,360 bits, and main scanning of 4,752 lines is performed.

In this manner, reading of an image on the entire surface of the original is performed, and an image signal having a level corresponding to the density of the original image is produced in units of lines.

The white reference board 208 has a uniform density and is read by the CCD 207 before actual original read so as to correct any irregularities in the read signals from the CCD 207 or form signals as a reference for light amount control of the halogen lamp 202. In other words, the reading output of the white reference board 208 by the CCD 207 is ideally a signal having the same level for all the pixels. Therefore, when the reading output of the white reference board 208 from the CCD 207 is examined, a reading failure of the CCD 207, degradation of the halogen lamp or the like can be confirmed.

After the reading of the original is completed, the mirrors and the light source are returned to the positions indicated by the solid lines at high speed.

Figure 8:
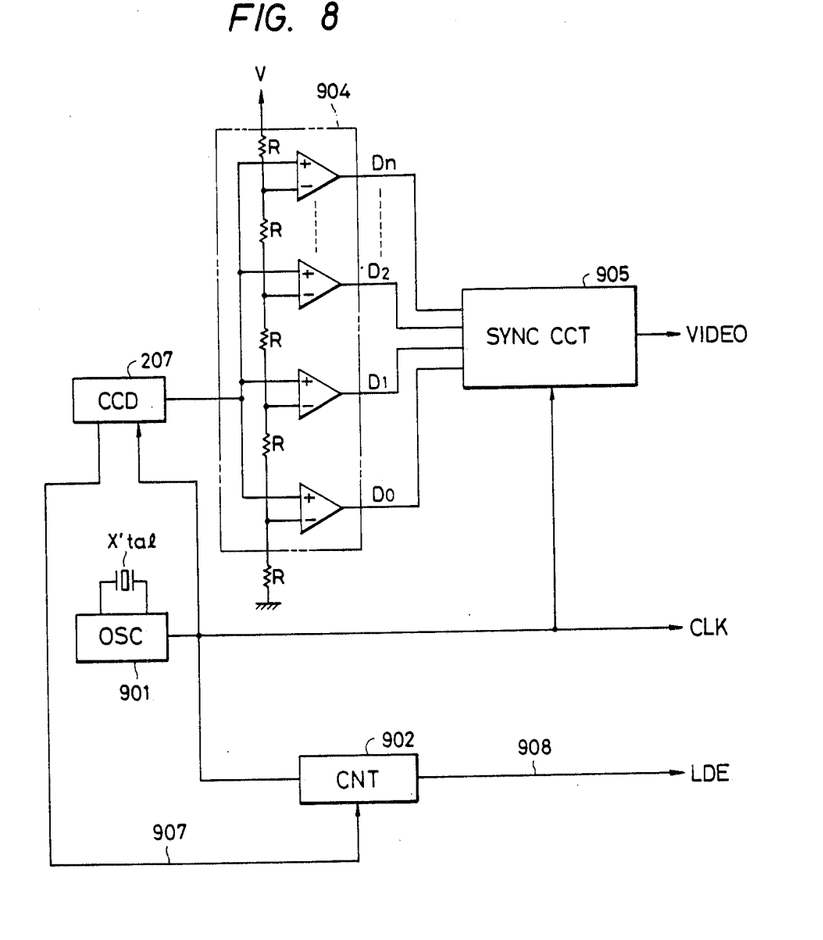
FIG. 8 is a circuit diagram of a CCD driver of the apparatus shown in FIG. 1.

FIG. 8 is a circuit diagram showing an example of the driver for the CCD 207 shown in FIG. 7. The CCD 207 is a CCD (photoelectric transducer element) similar to that shown in FIG. 1. A quartz oscillator 901 generates clock signals CLK as a reference for the image reading operation. A counter 902 counts the clock signals CLK from the quartz oscillator 901. When a shift pulse 907 instructing shift register transfer start from the CCD 207 is received, the counter 902 produces a high-level output 908 and starts counting the clock signals CLK. The counter 902 produces a low-level output 908 upon counting the number of clock signals CLK corresponding to the number of pixels per line (3,360 in this embodiment). The output 908 is used as an LDE signal to be described later.

An A/D converter 904 converts an analog signal having a level corresponding to the density of the image and received from the CCD 207 into an n-bit digital signal. The A/D converter 904 comprises n; and comparators which compare input analog signals with a potential obtained by voltage division through a corresponding resistor R and produce outputs D0 to Dn. The n-bit signal from the A/D converter 904 is produced as n-bit pixel data from a synchronizing circuit 905 in synchronism with the clock signals CLK.

Figure 3:
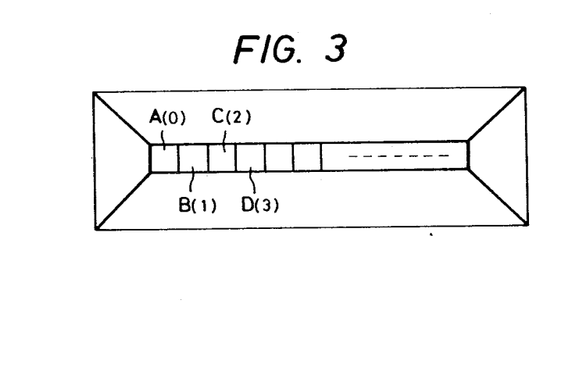
FIG. 3 is a model representation of a solid image sensor (CCD)

FIG. 3 is a model representation of the CCD in the image information reader 25. As shown in FIG. 3, a plurality of light-receiving elements A to D and so on are linearly aligned. All the pixels are indicated with reference numerals 0, 1, 2, 3 and so on from the left. These numerals will be referred to as addresses corresponding to the pixels hereinafter.

The mode of operation of the apparatus of this embodiment will be described with reference to a control flow chart in the CPU 8 shown in FIG. 4. The program of this control sequence is stored in a ROM of the CPU 8.

In the video monitor apparatus of this embodiment, an execution mode to be described below is selected and executed by the mode selection keys on the keyboard. Seven execution modes are available as follows:

Mode 1. An address of pixel data in the CCD is designated and the pixel data at this address is displayed. (FIG. 4(C))

Mode 2. Pixel data from address 0 to a maximum address designated by the address switch 17 is sequentially displayed. (FIG. 4(D))

Mode 3. Maximum and minimum data among the pixel data of the solid image sensor from address 0 to the maximum address are displayed. (FIG. 4(E))

Mode 4. The number of pixel data exceeding a predetermined value among the pixel data of the solid image sensor from address 0 to the maximum address is displayed. (FIG. 4(F))

Mode 5. Pixel data of the solid image sensor at a given address is addressed and read, and the data at the same address is read again at least once so as to display the maximum value of the difference between the image data read at least twice in this manner and to display the address of the pixel data having this difference. (FIG. 4(G))

Mode 6. An address of the pixel data of the solid image sensor is designated and read, and a difference between this data and the adjacent data is displayed. (FIG. 4(H))

Mode 7. Pixel data in the main scanning direction of the image is read and displayed in the low (speed) mode after sampling at a period corresponding to a given number of pixels, and this display operation is repeated to display all the pixels within one line. (FIG. 4(I))

Figures 4A, 4C:
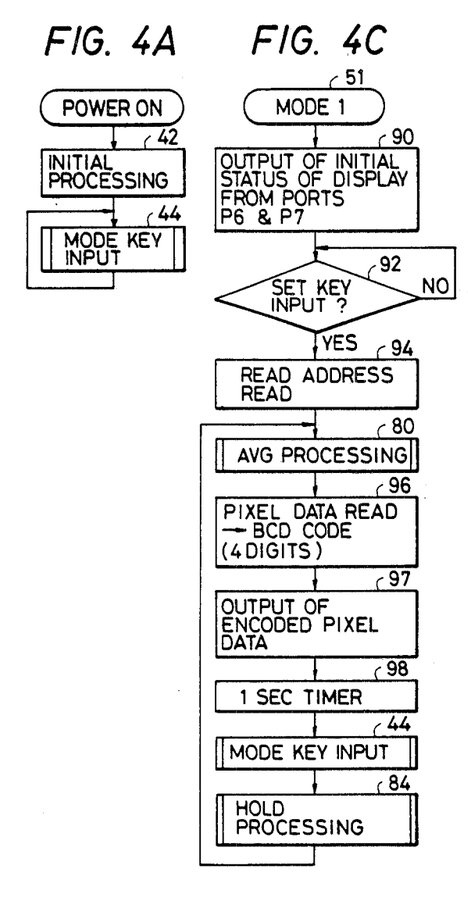
FIGS. 4(A) to 4(L) are control flow charts of the apparatus shown in FIG. 1.
Figure 4B:
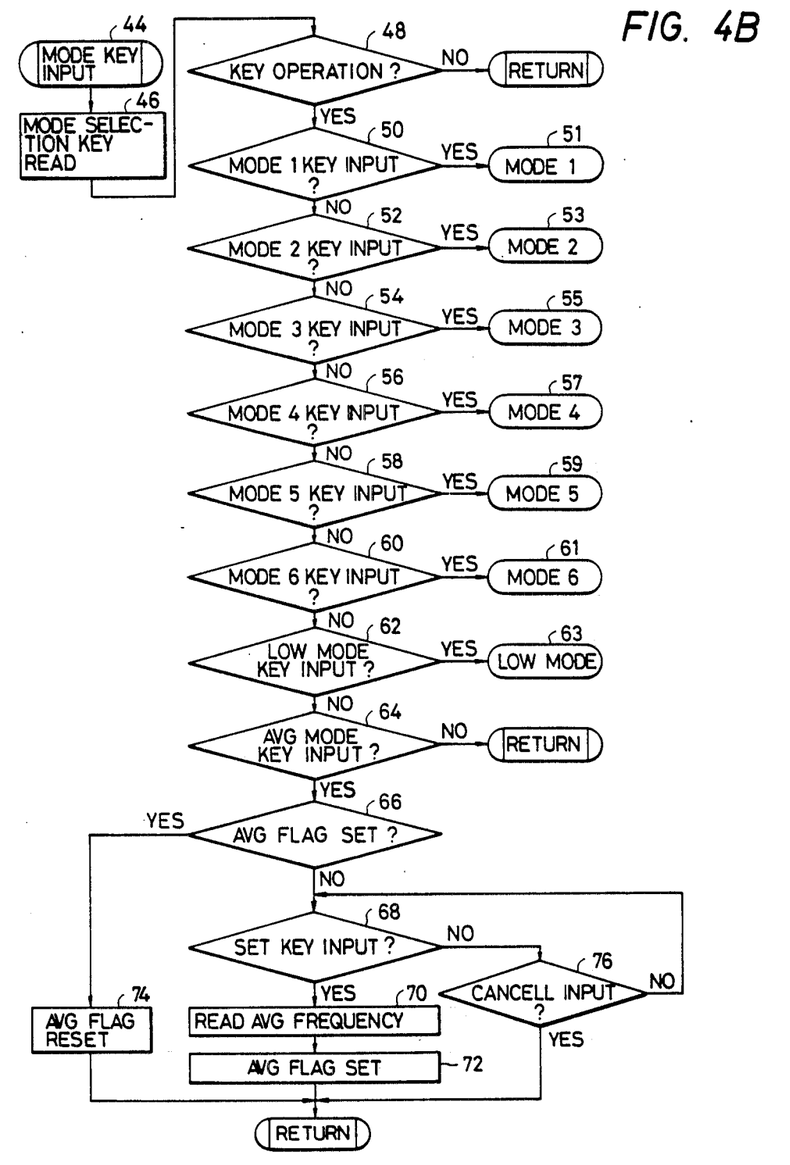
Figure 4D:
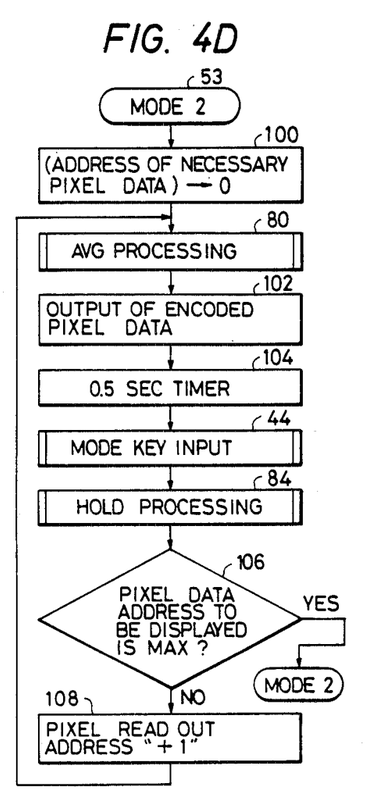
Figure 4E:
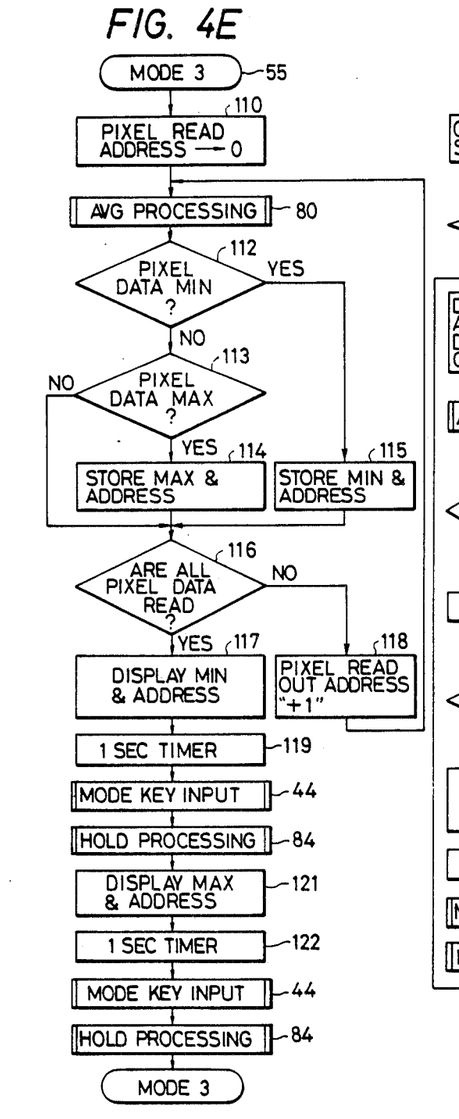
Figure 4F:
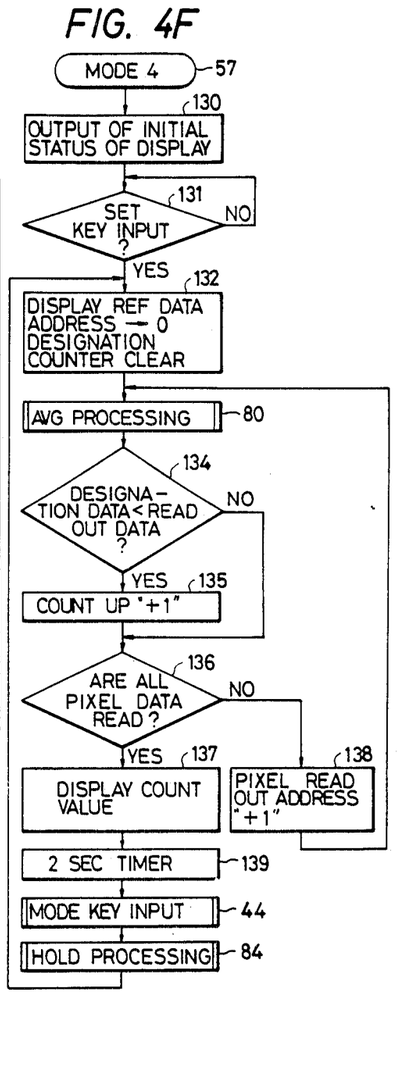
Figure 4G:
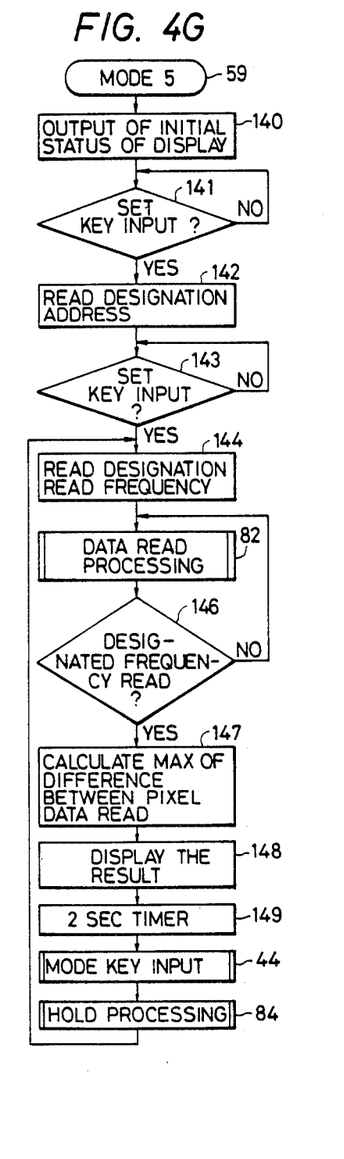
Figure 4H:
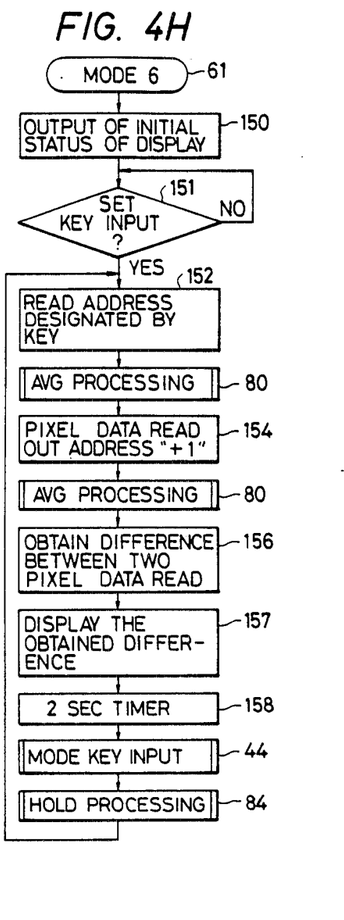
Figure 4I:
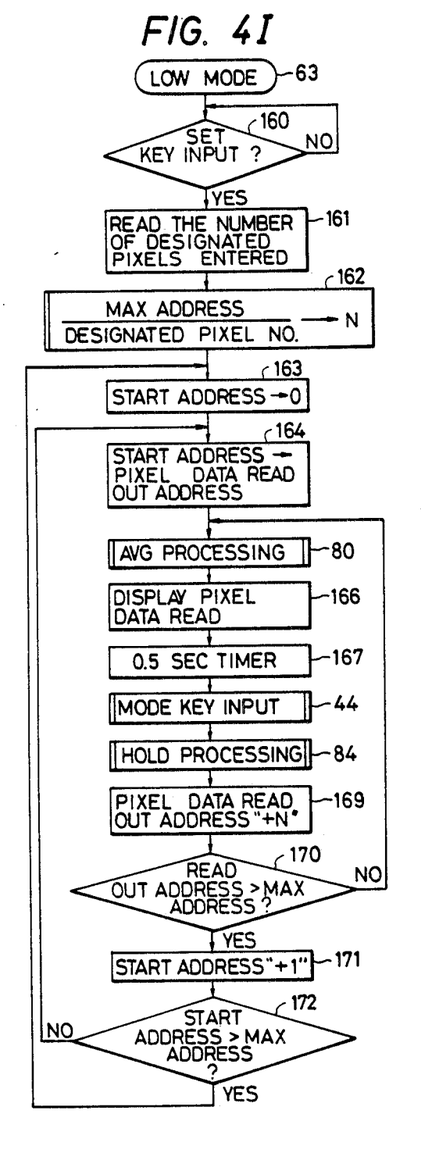
Figure 4J:
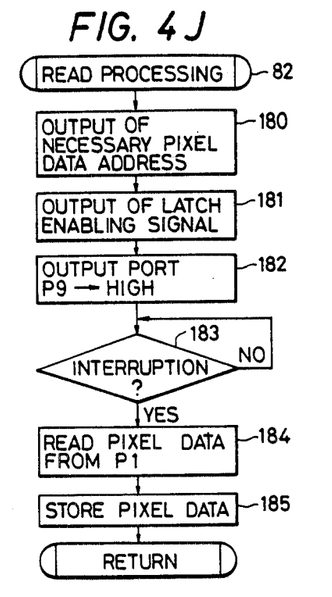
Figures 4K, 4L:
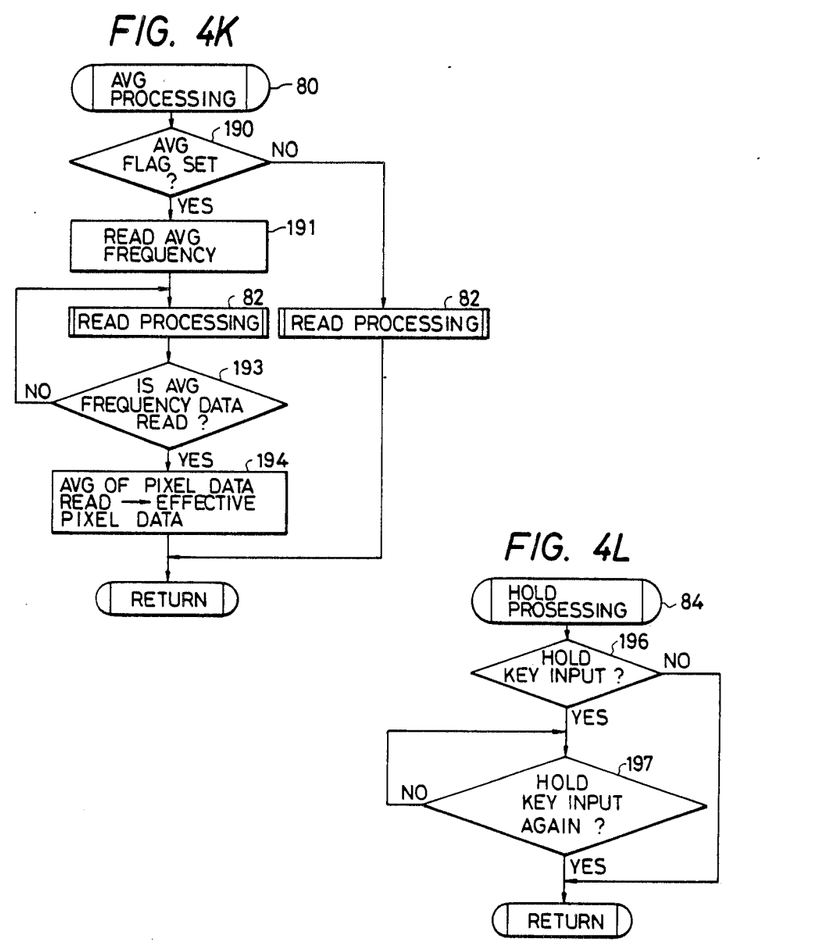

In addition to these seven modes, average mode processing (FIG. 4(K)) can be performed. This mode can be set by depressing an "Average" key among the mode selection keys. After the "Average" key is depressed, the data read frequency is inputted by means of the ten keys. Thereafter, one of modes 1 to 4 and 6 is selected. Then, the CPU 8 performs pixel data read operations for the specified number of times or frequency, and an average value of the obtained pixel data is obtained.

Each of the above modes is performed with reference to the signals obtained reading the white reference board or an original. However, if such a mode is performed for an output obtained by reading the white reference board, more accurate data can be obtained.

The operation in each mode will be described with reference to FIG. 4.

First, as shown in FIG. 4(A), when power for the apparatus of this embodiment is turned on, initial processing such as initialization of flags and registers is performed in step 42. Then, in step 44, mode key input processing is performed and a key input from the keyboard 16 is awaited.

The mode key input processing in step 44 will be described with reference to FIG. 4(B). In step 46, the mode selection key input data is read through the key input register 15. It is then discriminated in step 48 if a new key input operation has been performed. If NO in step 48, the mode key input processing is completed.

However, if YES in step 48, the flow advances to step 50 and thereafter. Steps 50 to 64 are executed to check which mode key has been depressed. Then, the driver 13 is driven to turn on the LED of the corresponding mode key, and the execution mode processing is performed in accordance with the mode key input.

If it is determined in step 64 that there has been an average mode key input, the flow advances to step 66 wherein it is checked if an average flag is set. This checking is to examine if the average mode processing was performed in the previous execution processing mode. If the average mode processing was performed and the average flag is set, an average mode release is determined. Thereafter, the average flag is reset and the mode key input processing is terminated.

If it is determined in step 66 that the average flag is not set, a case is determined wherein the average processing is performed in an execution mode processing to be selected later. The pixel data read frequency is inputted by the ten keys, and input of a "SET" key is monitored in steps 68 and 76.

If the average processing is not to be performed, the "average" key is depressed to cancel the input. Then, the flow goes to step 76 and the average processing is cancelled. When the average flag is determined to be set in step 66, the LED of the "Average" key is turned on.

When the average processing is to be performed, the operator inputs the pixel data read frequency by the ten keys and then depresses the "SET" key. When the "SET" key is depressed, the flow goes to step 70. The CPU 8 fetches the average read frequency for calculating the average value. The average flag is set in step 72, and the average processing is performed in the subsequent execution mode.

(Execution Mode 1)

When the "Mode 1" key is depressed in the mode key input processing, the flow advances from step 50 to mode 1 processing, starting from step 51. Details of the mode 1 processing are shown in FIG. 4(C).

Figure 5:
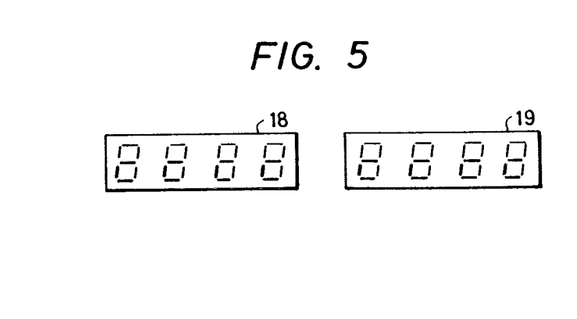
FIG. 5 is a diagram showing the initial display state of a display section of the apparatus shown in FIG. 1.

When the "Mode 1" key of the mode selection keys is depressed, the flow advances to the execution mode 1 processing (step 51) and then step 90 is executed. In step 90, the initial state display as shown in FIG. 5 is performed at the displays 18 and 19 through the decoders 9 and 10 and the drivers 11 and 12 via output ports P6 and P7 of the CPU 8. In this state, the operator enters the address of read pixel data of the CCD through the ten keys of the keyboard 16 and then depresses the "SET" key. The CPU 8 checks in step 92 if the "SET" key has been depressed. If YES in step 92, the pixel data read address is inputted in step 94 so as to execute the average processing in step 80.

Details of the average processing are shown in FIG. 4(K). The average processing in other execution modes is also performed in the same manner as described above. In the average processing, first, in step 190, it is checked if the average flag is set. This is to determine if the average mode processing designation for performing the average mode processing in steps 64 to 76 of the mode key input processing has been performed. If it is determined that the average flag is set, the processing starting from step 191 is performed. However, if the average flag is not set, the read processing in step 82 is performed. Details of the read processing in step 82 are shown in FIG. 4(J).

In the read processing (step 82), the pixel data read address designated by the CPU 8 is produced in a 4-bit BCD code to the address register 5 and to the decoder 9 through the output port P7, in step 180. The address code supplied to the decoder 9 is decoded and is automatically displayed at the display 18 through the driver 11. After the 4-bit address data is produced at the address register, the CPU 8 produces an address latch enable signal (LE signal) from an output port P8 and sets the address in the address register 5, in step 181. The address data set in the address register 5 is preset in the counter 6 when the LDE signal 29 synchronous with the address 0 of the CCD from the image information reader 25 is supplied to a load input terminal LD of the counter 6. In step 182, the CPU 8 produces an output enable signal (high level) to the NAND gate 7 through an output port P9. Then, the clock signal CLK 30 is supplied to a clock input terminal CK of the counter 6. The CLK 30 is a transfer clock of the pixel data and one clock signal CLK 30 is produced for each pixel data. Pixel data is supplied to the input buffer 2 from the image information reader 25 through the socket 24 and the connector 23 in synchronism with the clock signal CLK 30. The transferred pixel data is sequentially held in the hold register 3. If the NAND gate 7 satisfies the NAND conditions when the pixel data is held in the hold register 3, the clock signal signal CLK 30 is also supplied to the counter 6 which counts down from the value of the address register 5 preset by the LDE signal 29. The counter 6 is sequentially counted down. When the clock signals CLK 30 of the number designated by the address register 5 are supplied to the counter 6, the counter 6 produces a borrow signal BLW. Thus, the pixel data of the designated address is supplied to the hold register 3. The BLW signal is an input to an interrupt input terminal INT of the CPU 8 and a set signal for the read register 4. Thus, when the pixel data at the address position of the CCD which is designated through the output port P7 of the CPU 8 is set from the hold register 3 to the read register 4, an interruption is requested to the CPU 8.

After the CPU 8 makes the output port P9 go high in step 182, it advances to step 183 and awaits an input of an interruption request signal at the interrupt terminal INT. When the desired pixel data is set in the read register 4 in the manner described above, since the interruption request signal is received from the counter 6, the flow advances to step 184. In step 184, the pixel data is read from the read register 4 through an input port P1, and stores the input pixel data in step 185.

Referring back to FIG. 4(K), when the average flag is determined to be set in step 190 of the average processing (step 80), the flow goes to step 191. After the read average frequency set in step 70 (FIG. 4(B)) of the mode key input (step 44) is read, the read processing in step 82 is performed, the pixel data is read and the flow goes to step 193. In step 193 it is checked if the average frequency data (pixel data for the read average frequency) is read. If the average frequency data is not read, the average frequency data is read in step 82. Then, in step 194, the pixel data obtained by averaging the average frequency data is set as effective pixel data, and the average processing (step 80) is terminated.

The average frequency data or the read pixel data are temporarily stored in a RAM (random-access memory) (not shown) of the CPU 8.

As has been described above, the pixel data at a designated address is read a designated number of times, and the averaged data is handled as the pixel data at this address. In this manner, the pixel data is averaged, and variations of the pixel data over time can be eliminated. Furthermore, since the obtained pixel data is displayed digitally, a monitor apparatus capable of high-precision pixel data reading is presented.

In this manner, the problem of variations in the pixel data over time are eliminated. Therefore, light intensity of the light source and change over time of the light-receiving sensitivity of the CCD of the image information reader can be easily checked.

When the average processing in step 80 is terminated in the execution mode 1 processing (step 51), the flow goes to step 96 and the read pixel data is converted into a 4-bit BCD code. The 4-bit BCD code converted in step 97 is supplied to the decoder 10 through the output port P6. The decoder 10 converts the input code into a display pattern of the 7-segment LED indicator which corresponds to the input BCD code. The pattern is then displayed by the display 19 via the driver 12. Thereafter, when it is determined that 1 second has elapsed in step 98, the mode key input processing as shown in FIG. 4(B) is performed in step 44. If a new mode selection is not entered, the CPU 8 performs the hold processing in step 84. Thereafter, in order to update the read pixel data, the flow returns to the average processing in step 80. Read of the pixel data is repeatedly performed until the next execution mode is selected in the mode key input processing (step 44). The display data is thus updated. In this manner, the pixel data at a designated address is displayed together with the address.

Hold processing in step 84 will be described below. Details of the hold processing are shown in FIG. 4(L). In the hold processing (step 84), it is first checked if there has been a key input through the keyboard 16 in step 196. If the "Hold" key input is not present, the flow returns and the processing is terminated. However, if there has been a "Hold" key input, the CPU 8 drives the driver 13 so as to turn on the LED of the "Hold" key through an output port P5. In step 197, another depression of the "Hold" key is awaited. This is to render the apparatus in the hold mode upon the depression of the "Hold" key so as not to perform the pixel data read and the display data updating. When the "Hold" key is depressed again, the LED of the "Hold" key is turned off through the output port P5, the hold processing is terminated and the flow returns. This hold processing is the same in the hold processing in other execution modes.

In this manner, the CPU 8 performs the control of the LED of the keyboard 16 corresponding to the depressed mode selection key through the output port P6.

The display data to be supplied to the displays 8 and 19 is kept at the current display state unless it is updated.

In the apparatus of the present invention, the detected density level of a desired pixel of a solid image sensor can be digitally displayed with a simple operation. Therefore, the shading characteristics of the light source in an image information reader or the like can be easily known. Correction of the light source or correction of the pixel data can be easily performed based on the shading characteristics.

(Execution Mode 2)

When the "Mode 2" key is depressed to perform the execution mode 2, the flow advances to step 53 from step 52 of the mode key input processing (step 44), and the mode 2 (step 53) processing as shown in FIG. 4(D) is executed.

In step 100, the read address is set to "0". Thereafter, the average processing of step 80 described above is performed. The pixel data at address 0 is read and the pixel data read in step 102 is changed to a 4-bit BCD code. The code is produced through the output port P6 of the CPU 6 and is displayed by the display 19. The pixel address corresponding to this pixel data is displayed at the display 18. After 0.5 second is determined to have elapsed in step 104, the mode key input processing in step 44 and the hold processing in step 84 are executed. In step 106, it is checked if the pixel data address of the currently displayed pixel data is a maximum address designated by the address switch 17. If NO in step 106, the pixel read address is incremented by one. The steps 0 and thereafter are repeated to sequentially display the pixel data of the respective addresses. When the pixel data address reaches the maximum address, the flow returns to step 100 and the pixel data is displayed from address 0 again.

The maximum address designated by the address switch 17 is mainly determined by the number of pixels of the solid image sensor (CCD) in the image information reader 25. In order to monitor the desired group of pixels of the CCD, the read start address and the maximum addresses can be arbitrarily set.

In this manner, a monitor apparatus is realized which is capable of sequentially digitally displaying the pixel addresses and corresponding density level data of the read pixels of the solid image sensor.

Since the pixel data is displayed in accordance with the order of the pixel positions (addresses) of the solid image sensor in this monitor apparatus, the pixel data at all the pixel positions can be easily monitored.

(Execution Mode 3)

When the "Mode 3" key is depressed to execute the execution mode 3, the flow advances to step 55 from step 54 of the mode key input processing (step 44), and the mode 3 processing (steps 55 and thereafter) shown in FIG. 4(E) are executed.

In step 110, "0" is set as the pixel data read address. The average processing in step 80 is performed, and the pixel data of address 0 is read. It is then checked in step 112 if the read pixel data is a minimum value. It is also checked in step 113 if the red pixel data is a maximum value. If the read pixel data is a minimum or maximum value, the minimum value and the corresponding address or the maximum value and the corresponding address are stored in step 114 or 115, respectively. When the address is 0, since there is no previous read data, the read data is determined as a minimum value. When the maximum or minimum value and the corresponding address are stored or when the read value is neither of the maximum and minimum values, the flow goes to step 116. In step 116, it is checked if the pixel data has been read to the maximum address designated by the address siwtch 17. If NO in step 116, the address is incremented by one in step 118, and steps 80 and thereafter are executed to perform processing for the pixel data of the updated (incremented) address. However, if YES in step 116, the minimum value is displayed at the display 19, and the address is displayed at the display 18, in step 117. Thereafter, after it is determined in step 119 that one second has elapsed, the maximum value is displayed at the display 19 and the address is displayed at the display 18 after the mode key input processing of step 44 and the hold processing in step 84. After it is determined that one second has elapsed in step 122, the mode key input processing of step 44 and the hold processing of step 84 are performed. Thereafter the pixel data is read from address 0 again, and the maximum or minimum value is updated. In the execution mode 3, the read start address and the maximum address can be arbitrarily set, and maximum and minimum values of a desired pixel area can be detected.

In this manner, a monitor apparatus is realized which is capable of digitally displaying maixmum and minimum values and corresponding pixel positions among the pixel data of one image main scanning line of a solid image sensor. With this apparatus, the maximum and minimum values can be substantially simultaneously confirmed without reading all the pixel data and checking the read data, so that the operator can determine the dynamic range of the solid image sensor and image processing facilitated.

(Execution Mode 4)

When the execution mode 4 is selected, the "Mode 4" of the keyboard 16 is depressed. When the "Mode 4" key is depressed, the flow advances to step 57 from step 56 of the mode key input processing (step 44), and the mode 4 processing (step 57) shown in FIG. 4(F) is performed.

In the execution mode 4 processing, the initial statuses of the displays 18 and 19 as shown in FIG. 5 are set in step 130. In step 131, reference or designation pixel data is inputted with the ten keys. When the "SET" key is depressed, the input designation pixel data is read in step 132. The read designation pixel data is produced from the output port P6 of the CPU 8 and is displayed at the display 19 through the decoder 10 and the driver 12. The pixel read address is set at "0" and the designation counter for designating a predetermined area of the RAM of the CPU 8 is cleared. Thereafter, the average processing of step 80 is executed. It is then checked in step 134 if the read out data is more than the designation data. If YES in step 134, the designation counter is incremented by one. If it is determined in step 136 that the read data is less than the maximum address designated by the address switch 17, that is, the reading of all the designated pixel data is not completed, the address is incremented by one in step 138. Thereafter, the average processing of step 80 is executed to perform processing for the pixel data of the next address. However, if it is determined in step 136 that reading of all the pixel data has been completed, the flow advances to step 137 wherein the value of the designation counter, that is, the number of pixels of pixel data exceeding the designation data is displayed at the display 18 through the decoder 9 and the driver 11 via the output port 7 of the CPU 8. After this display state is continued for 2 seconds in step 139, the hold processing of step 84 is executed. The flow then returns to step 132, read of pixel data is performed, and data is updated.

In the above example, the number of pixel data exceeding the designation data is detected. However, the number of pixel data below the designation data can be detected and displayed.

In this mode, the read start address and the maximum address can be arbitrarily set to allow monitoring of pixels within a desired area of the CCD.

In this manner, a monitor apparatus is realized which is capable of digitally displaying the number of pixels exceeding or below a desingated value among the read density level data of the pixels of a solid image sensor. Therefore, if an image information reader is connected to an image information processor such as a printer, the correlation between the value of the original density, the pixel data value and the printing density can be easily measured. Therefore, the data on this correlation can be used as data for $\gamma$-correction, thereby allowing high-precision correction.

(Execution Mode 5)

In order to execute the execution mode 5, the "Mode 5" key of the keyboard 16 is depressed. When the "Mode 5" key is depressed, the flow advances to step 59 from step 58 of the mode key input processing (step 44), and the mode 5 processing shown in FIG. 4(G) is executed.

In step 140, the displays 18 and 19 are initialized as shown in FIG. 5. In step 141, the depression of the "SET" key is checked. The operator first inputs the address of pixel data to be read out by the ten keys of the keyboard 16, and then depresses the "SET" key. When the "SET" key is depressed, the flow advances from step 141 to 142. In step 142, the input address is read, produced through the output port P7, and displayed at the display 18. Then, the second depression of the "SET" key is awaited in step 143. When the operator inputs a read designation read frequency for designating the read designation read frequency after inputting the address and then depresses the "SET" key, the flow advances to step 144 from step 143 to read the input read designation read frequency. Then, data read of step 82 is performed for the input read designation read frequency (loop of steps 82 and 146). When the read operation for the input read designation read frequency is performed, the flow advances from step 146 to 147. In step 147, the maximum value of the differences of the read pixel data is calculated. In step 148, the maximum value is produced through the output port P6 and is displayed at the display 19 through the decoder 10 and the driver 12. After continuing the display for 2 seconds, the mode input processing of step 44 and the hold processing of step 84 are executed. The flow then returns to step 144 and data updating is performed.

In this manner, a monitor apparatus is realized which is capable of digitally displaying the maximum value of the differences of the read pixel data read for an input designation read frequency from pixels at designated positions of a solid image sensor. Variations in the pixel data reading and A/D conversion of the solid image sensor can be measured, and resolution of the image density can be quite easily detected.

(Execution Mode 6)

In order to perform the execution mode 6, the "Mode 6" key of the keyboard 16 is depressed. When the "Mode 6" key is depressed, the flow advances to step 61 from step 60 of the mode key input processing (step 44). The mode 6 processing shown in FIG. 4(H) is executed.

In the mode 6 processing (step 61), in step 150, the initial state of the display as shown in FIG. 5 is displayed. In step 151, depression of the "SET" key is checked. The operator depresses the "Mode 6" key. After the mode 6 processing selection, the operator inputs a designation address by the ten keys of the keyboard 16 and depresses the "SET" key again. When the "SET" key is depressed, the flow advances from step 151 to step 152. The input read address designated by the key is read, produced through the output port P7, and displayed at the display 18.

The average processing of step 80 is performed. The pixel data of the designated address is read, and the designated address is incremented by one in step 154. Another average processing of step 80 is performed to read the pixel data at the address updated by being incremented by one. Thereafter, in step 156, the difference between the two read pixel data is calculated. The calculated difference is produced through the output port P6 of the CPU 8, and displayed at the display 19, in step 157. The display at the display 19 is performed for 2 seconds in step 149. Thereafter, the mode key input processing of step 44 and the hold processing of step 84 are executed. The flow then returns to step 144, and the difference of the pixel data is updated.

In this example, the pixel data of a designated address and the pixel data of the next address is detected. However, a difference between the pixel data of a designated address and the pixel data of the immediately preceding address can be detected.

It is also possible to calculate and display the difference between the average value of the pixel data of addresses before and after a designated address.

In this manner, a monitor apparatus is realized which is capable of digitally displaying the difference between the pixel data of a designated position of a solid image sensor and pixel data at a position adjacent thereto.

For this reason, with this apparatus, when the image density is monitored for a predetermined period within one scanning line, the reading precision of the original density or focusing of the incident light on the surface of the solid image sensor can be improved using the monitored data.

(Execution Mode 7)

In order to execute the execution mode 7, the "Low" key of the keyboard 16 is depressed. When the "Low" key is depressed, the flow advances to step 63 from step 62 of the mode key input processing (step 44). The low mode processing as shown in FIG. 4(I) is executed.

In the low mode processing (step 63), in step 160, the operator enters a desired number of pixels by the ten keys of the keyboard 16 and depresses the "SET" key on the keyboard 16. When it is determined in step 160 that the "SET" key is depressed, the flow advances to step 161 wherein the input number of designated pixels is read. In step 162, the maximum address designated by the address switch 17 is divided by the input number of designated pixels. If the quotient is not an integer, the fractions are rounded. The obtained result is represented as N. In step 163, the start address is set at "0". In step 164, the start address is set as the read address of the pixel data. The average processing of step 80 is executed. The pixel data at the read address is read. In step 166, the read pixel data is displayed at the display 19. After 0.5 second is confirmed to have elapsed in step 167, the mode key input processing of step 44 and the hold processing of step 84 are executed. Thereafter, the value N calculated in step 162 is added to the read address in step 169. In step 170, it is checked if the resultant sum value is less than the maximum address designated by the address switch 17. If NO in step 170, the flow returns to the average processing of step 80, and the pixel data of the updated address is read and displayed. However, if YES in step 170, the start address is incremented by one in step 171. It is then checked in step 172 if the resultant address exceeds the maximum address. If YES in step 172, the flow returns to step 163. In step 163, the start address is reset to "0" and the subsequent processing is performed. However, if NO in step 172, the flow goes to step 164. The start address is set as the pixel data read address, and the subsequent processing is performed.

In this manner, pixel signals read at high speed can be sampled and displayed for every desired number of pixels (N in step 162), so that the change in the pixel data signals read at high speed can be reduced to 1/N. Therefore, a monitor apparatus which allows visual observation of flow of data signals is realized.

As described above, output signals after A/D conversion of the pixel signals of a solid image sensor (CCD) are processed by a microcomputer (CPU 8) so that desired pixel density levels can be digitally displayed at high speed and with high precision.

When the execution mode 1 is selected and executed, the pixel data of the designated address of the CCD is immediately digitally displayed. Therefore, the pixel data at addresses to be accessed which change at high speed can be easily read and monitored. With this feature, the shading characteristics of the light source in an image reader can be determined, and correction of the light source or pixel data can be performed based on the shading characteristics.

When the execution mode 2 is selected and executed, the pixel data is sequentially displayed in the order of addresses. In this mode, the operator can monitor the pixel data without designating addresses. The pixel data of a CCD such as video signals which change at high speed are displayed at predetermined periods, so that monitoring of signals is easy. Since the pixel data is displayed in the order of addresses, the pixel data over the entire address area can be monitored.

When the execution mode 3 is selected and executed, maximum and minimum values and corresponding addresses among the pixel data of one main scanning line are displayed. Therefore, the operator need not sample all the pixel data. Furthermore, by confirming the maximum and minimum values, the dynamic range of the CCD can be determined and image processing is facilitated.

When the execution mode 4 is selected and executed, the pixel data exceeding a designated value is displayed. Therefore, when an image reader is connected to an image processor such as a printer, the correlation of the original density, the pixel data value, and the printing density can be easily determined. This correlation can be utilized as data for correction to allow high-precision correction.

When the execution mode 5 is selected and displayed, the pixel data of a designated address is read a designated number of times or frequency, and the maximum value of the differences of the read pixel data is displayed. With this data, variations in the pixel data read from the CCD and A/D converted can be monitored, and the resolution of the image density can be easily determined.

When the execution mode 6 is selected and executed, the difference between the pixel data of a designated address of the CCD and the pixel data of a next address is monitored. This is performed for a predetermined period within one scanning line so that read precision of the original density or focusing of incident light on the CCD are facilitated.

When the execution mode 7 (low mode) is selected and executed, the pixel signals read at high speed are sampled at every several tens or hundreds of pixels (N in step 162) and the read signals are displayed. Therefore, changes in the pixel data signals can be reduced to 1/N. Thus, the flow of the pixel data signals can be visually monitored.

When the average value of pixel data read from a designated address a designated number of times or frequency in average processing is handled as the pixel data at this address, the pixel data is averaged and variations over time of the pixel data are eliminated. In this manner, since variations over time of signals during reading are eliminated, signal monitoring can be performed for determining the light amount of a light source of an image information reader and light-receiving sensitivity of the CCD.

When the "Hold" key is depressed to set the hold mode in each mode processing, the contents of the current mode are held. When this mode is set, the display contents which change periodically can be recorded with ease.

In the embodiment described above, reading of pixel data is pin compatible with an IC such as a pixel data latch on the substrate of the image information reader. Therefore, the flow of the pixel data on the substrate of the image information reader is not stopped.

It is also possible to return the read pixel data onto the substrate. It is also possible to use only a single input/output connector for a monitor apparatus and to connect the connector to a clip or the like to the IC chip of the substrate of the image information reader.

Figure 6:
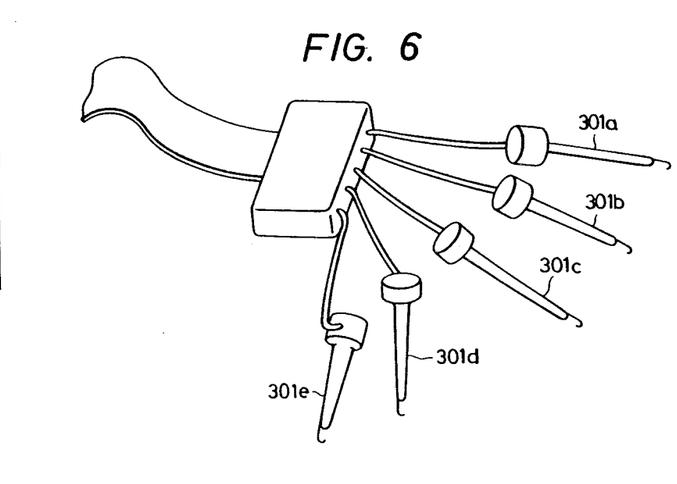
FIG. 6 is a view showing an example of a modified input/output connector of the apparatus shown in FIG. 1.

As in a logic analyzer, the input/output signal can be coupled not through a connector but through individual clips which can be connected to the IC pins and the IC clips. FIG. 6 shows an embodiment wherein the signal coupling is achieved through such individual clips 301a to 301e.

In this embodiment, the pixel data of one pixel is sampled for each scanning of the CCD. Therefore, a plurality of scanning operations must be performed so as to sample a plurality of data. However, a configuration for sampling a plurality of data with a single scanning operation can also be achieved. For example, the set value of the counter 6 determining the sampling timing can be reset a plurality of times during the scanning operation or a plurality of counters 6 can be arranged so as to provide a plurality of sampling timing signals within one scanning period. Alternatively, a memory for holding pixel data corresponding to one scanning operation is arranged, and desired pixel data is extracted by addressing this memory.

A signal source to be monitored is not limited to a one-dimensional CCD but can be an image sensor wherein light-receiving elements are arranged two-dimensionally. The display is not limited to an LED but can be a liquid crystal display. The monitor apparatus of the present invention is not limited to display of detection data with a display but can also print out the data with a printer. The data can also be stored in a memory or the like as maintenance/management data. The monitor apparatus can be assembled into the main body of an image information reader.

What is claimed is:

1. An image data monitor apparatus comprising:
   means for inputting a plurality of pixel data;
   means for designating desired pixel data among the plurality of image data;
   means for extracting the pixel data designated by said designating means from the plurality of pixel data inputted from said inputting means; and
   means for displaying the pixel data extracted by said extracting means.

2. An apparatus according to claim 1, wherein the pixel data indicates a density level of a read image.

3. An apparatus according to claim 1, wherein said displaying means numerically displays the pixel data.

4. An apparatus according to claim 1, further comprising position display means for displaying a position of the pixel data extracted by said extracting means.

5. An apparatus according to claim 1, wherein said inputting means continuously inputs the plurality of pixel data in synchronism with a clock signal, said extracting means has means for counting the clock signals so as to extract the pixel data in accordance with a count of said counting means.

6. An apparatus according to claim 1, wherein said extracting means extracts a plurality of pixel data corresponding to a single pixel and inputted from said inputting means so as to calculate an average value thereof.

7. An apparatus according to claim 1, wherein said inputting means has a plurality of image sensing elements for photoelectrically reading an image, and inputs the pixel data from means for forming a plurality of pixel data corresponding to said plurality of image sensing elements.

8. An image data monitor apparatus comprising:
   means for inputting a plurality of image data;
   means for designating desired pixel data among said plurality of pixel data;
   means for repeatedly extracting the pixel data designated by said designating means from the plurality of image data repeatedly inputted from said inputting means; and means for detecting a relationship between the plurality of pixel data repeatedly extracted by said extracting means.

9. An apparatus according to claim 8, wherein said detecting means detects a difference between said plurality of pixel data extracted by said extracting means.

10. An apparatus according to claim 8, further comprising means for presetting the number of repeating an input operation of said plurality of pixel data by said inputting means.

11. An apparatus according to claim 8, further comprising means for displaying the relationship between the plurality of pixel data detected by said detecting means.

12. An apparatus according to claim 11, wherein said displaying means numerically displays the relationship.

13. An apparatus according to claim 8, wherein said inputting means has a plurality of image sensing elements for photoelectrically reading an image, and inputs the pixel data from means for forming a plurality of pixel data corresponding to said plurality of image sensing elements.

14. An image data monitor apparatus comprising:
means for inputting a plurality of pixel data;
means for designating desired pixel data among said plurality of pixel data;
means for extracting first pixel data designated by said designating means and second pixel data in the vicinity of the first pixel data from said plurality of pixel data inputted from said inputting means; and
means for detecting a relationship between the first and second pixel data extracted by said extracting means.

15. An apparatus according to claim 14, wherein said detecting means detects a difference between the first and second pixel data.

16. An apparatus according to claim 14, wherein the second pixel data is pixel data adjacent to the first pixel data.

17. An apparatus according to claim 14, further comprising means for displaying the relationship detected by said detecting means.

18. An apparatus according to claim 14, wherein said inputting means has a plurality of image sensing elements for photoelectrically reading an image, and inputs the pixel data from means for forming a plurality of pixel data corresponding to said plurality of image sensing elements.

19. An image data monitor apparatus comprising:
means for repeatedly inputting a plurality of pixel data;
means for presetting the number of repeating an input operation of said plurality of pixel data from said inputting means;
means for reading a plurality of pixel data corresponding to a single pixel which are repeatedly input for the number of times preset by said presetting means; and
means for detecting an average value of said plurality of pixel data corresponding to the single pixel read by said reading means.

20. An apparatus according to claim 19, further comprising means for presetting pixel data, an average value of which must be detected by said detecting means.

21. An apparatus according to claim 19, further comprising means for displaying the average value detected by said detecting means.

22. An apparatus according to claim 19, wherein said inputting means has a plurality of image sensing elements for photoelectrically reading an image, and inputs the pixel data from means for forming a plurality of pixel data corresponding to said plurality of image sensing elements.

23. An image data monitor apparatus comprising:
means for inputting a plurality of pixel data;
means for detecting a maximum or minimum value of said plurality of pixel data inputted from said inputting means; and
means for displaying the maximum or minimum value detected by said detecting means.

24. An apparatus according to claim 23, further comprising position display means for displaying a position of a pixel corresponding to the maximum or minimum value of the pixel data detected by said detecting means.

25. An apparatus according to claim 23, wherein the pixel data indicates a density of an image.

26. An apparatus according to claim 23, wherein said inputting means has a plurality of image sensing elements for photoelectrically reading an image, and inputs the pixel data from means for forming a plurality of pixel data corresponding to said plurality of image sensing elements.

27. An image data monitor apparatus comprising:
means for inputting a plurality of pixel data;
means for comparing said plurality of pixel data from said inputting means with reference data; and
means for detecting the number of pixel data which is determined by said comparing means to have a specific relationship.

28. An apparatus according to claim 27, wherein said inputting means has a plurality of image sensing elements for photoelectrically reading an image, and inputs the pixel data from means for forming a plurality of pixel data corresponding to said plurality of image sensing elements.

29. An apparatus according to claim 27, wherein the pixel data inputted from said inputting means indicates a density of an image.

30. An image data monitor apparatus comprising:
means for inputting a plurality of pixel data;
means for sequentially extracting the pixel data corresponding to different pixels; and
means for sequentially displaying the extracted pixel data.

31. An apparatus according to claim 30, further comprising position display means for displaying a position of a pixel corresponding to the pixel data displayed by said displaying means.

32. An apparatus according to claim 30, wherein the plurality of pixel data are serially inputted, and said extracting means extracts the pixel data in accordance with an arranged order of the plurality of pixel data.

33. An apparatus according to claim 30, wherein said inputting means has a plurality of image sensing elements for photoelectrically reading an image, and inputs the pixel data from means for forming a plurality of pixel data corresponding to said plurality of image sensing elements.

34. An image data monitor apparatus comprising:
means for inputting a plurality of pixel data;

means for extracting said plurality of pixel data inputted from said inputting means at a predetermined period; and means for displaying the pixel data extracted by said extracting means.

35. An apparatus according to claim 34, further comprising means for presetting an extraction period of the pixel data by said extracting means.

36. An apparatus according to claim 34, wherein said inputting means has a plurality of image sensing elements for photoelectrically reading an image, and inputs the pixel data from means for forming a plurality of pixel data corresponding to said plurality of image sensing elements.

37. An image data monitor apparatus comprising:
means for inputting a plurality of pixel data;
means for comparing said plurality of pixel data from said inputting means with reference data; and
means for detecting the number of pixel data which is determined by said comparing means to have a specific relationship, wherein said detecting means detects the number of pixel data which exceeds the reference data.

38. An image data monitor apparatus comprising:
means for inputting a plurality of pixel data;
means for comparing said plurality of pixel data from said inputting means with reference data;
means for detecting the number of pixel data which is determined by said comparing means to have a specific relationship; and
means for displaying the number of pixel data detected by said detecting means.

39. An image data monitor apparatus comprising:
means for inputting a plurality of pixel data;
means for comparing said plurality of pixel data from said inputting means with reference data;
means for detecting the number of pixel data which is determined by said comparing means to have a specific relationship; and
means for presetting the reference data to be compared with the pixel data.

* * * * *